(12) United States Patent
Ruffin

(10) Patent No.: US 10,203,768 B2
(45) Date of Patent: Feb. 12, 2019

(54) BLIND KEY PAD

(71) Applicant: Franklin Donald Ruffin, Tuscaloosa, AL (US)

(72) Inventor: Franklin Donald Ruffin, Tuscaloosa, AL (US)

( * ) Notice: Subject to any disclaimer, the term of this patent is extended or adjusted under 35 U.S.C. 154(b) by 261 days.

(21) Appl. No.: 14/033,223

(22) Filed: Sep. 20, 2013

(65) Prior Publication Data

US 2015/0084870 A1  Mar. 26, 2015

(51) Int. Cl.
*G04G 9/00* (2006.01)
*G07C 9/00* (2006.01)
*B41J 5/10* (2006.01)
*G06F 3/023* (2006.01)
*G06F 3/02* (2006.01)
*A63F 13/20* (2014.01)
*G09B 21/00* (2006.01)

(52) U.S. Cl.
CPC .......... *G06F 3/0219* (2013.01); *G06F 3/0234* (2013.01); *G09B 21/003* (2013.01)

(58) Field of Classification Search
CPC ............. H01H 13/70; G06F 3/021; B41J 5/10
See application file for complete search history.

(56) References Cited

U.S. PATENT DOCUMENTS

| 493,573 | A | * | 3/1893 | Brown | A47C 9/002 |
| | | | | | 297/314 |
| 3,631,403 | A | * | 12/1971 | Asbo | G06F 3/0227 |
| | | | | | 705/25 |
| 4,292,510 | A | * | 9/1981 | Hild | G04G 9/007 |
| | | | | | 235/145 R |
| 4,849,732 | A | * | 7/1989 | Dolenc | B41J 5/10 |
| | | | | | 341/20 |
| 4,913,573 | A | * | 4/1990 | Retter | B41J 5/10 |
| | | | | | 345/163 |
| 4,971,465 | A | * | 11/1990 | Hashimoto | B41J 5/10 |
| | | | | | 400/472 |
| 6,766,179 | B1 | * | 7/2004 | Shiau | G06F 3/018 |
| | | | | | 341/28 |
| 2001/0008848 | A1 | * | 7/2001 | Armstrong | A63F 13/06 |
| | | | | | 463/37 |
| 2002/0118175 | A1 | * | 8/2002 | Liebenow | G06F 1/1626 |
| | | | | | 345/168 |
| 2003/0043123 | A1 | * | 3/2003 | Hinckley | G06F 3/021 |
| | | | | | 345/173 |
| 2003/0067444 | A1 | * | 4/2003 | Ehrenburg | G06F 3/0235 |
| | | | | | 345/168 |
| 2005/0269196 | A1 | * | 12/2005 | Brown et al. | 200/502 |
| 2010/0225619 | A1 | * | 9/2010 | Soumi | G06F 3/0362 |
| | | | | | 345/184 |

(Continued)

FOREIGN PATENT DOCUMENTS

EP    1213731    *   6/2002   ............. A63F 13/20

*Primary Examiner* — Lin Li
(74) *Attorney, Agent, or Firm* — Dunlap Bennett & Ludwig PLLC; Brendan E. Squire

(57) ABSTRACT

A key pad device provides the same function as a keyboard or keypad with a mistake proof design that allows one hand use and only requires three fingers. Each of the primary two fingers has nine pressure points, or keys, whose location is accessible by moving left to right, up and down, forward and back, side to side, and center. A thumb toggle can operate in one of three positions—up, down or not toggled.

14 Claims, 2 Drawing Sheets

(56) References Cited

U.S. PATENT DOCUMENTS

| | | | | |
|---|---|---|---|---|
| 2012/0146764 A1* | 6/2012 | Kitchen | ............ | G07C 9/00142 |
| | | | | 340/5.51 |
| 2012/0218178 A1* | 8/2012 | Miyaji | ................. | G06F 3/0236 |
| | | | | 345/156 |
| 2012/0306614 A1* | 12/2012 | Kaufman | ........... | G07C 9/00944 |
| | | | | 340/5.28 |
| 2014/0263159 A1* | 9/2014 | Kappes | ................. | B65D 23/00 |
| | | | | 215/383 |

\* cited by examiner

BLIND KEY PAD

BACKGROUND OF THE INVENTION

The present invention relates to data entering key pads and, more particularly, to a blind key pad allowing for data entry while not looking at the key pad.

Typical key pads are designed in a planar design. This can result in data entry errors or slower data entry as it can be difficult to determine whether one is actually depressing the proper keys or if their fingers are properly positioned on the key pad.

While some keyboards and numeric keypads have small finger locator bumps, such as those found on the "f" key, the "j" key or the number "5", these locators are limited to requiring the user to feel, with one specific finger, whether their fingers are properly positioned for data entry. Feeling for these small protrusions can be time consuming.

As can be seen, there is a need for an improved key pad that can assure proper finger placement while increasing data entry speed and accuracy.

SUMMARY OF THE INVENTION

In one aspect of the present invention, a key pad comprises a housing; a first finger slot formed as a first depression in the housing; a second finger slot formed as a second depression in the housing; a plurality of keys disposed in each of the first and second finger slots; and a thumb rocker switch disposed adjacent the first finger slot, the thumb rocker switch causing variable outputs to be generated by each of the keys when the thumb rocker switched is toggled on and off.

In another aspect of the present invention, a key pad comprises a housing; a first finger slot formed as a first cross-shaped depression in the housing; a second finger slot formed as a second cross-shaped depression in the housing; nine keys disposed in each of the first and second finger slots; and a thumb rocker switch disposed adjacent the first finger slot, the thumb rocker switch causing variable outputs to be generated by each of the keys when the thumb rocker switched is toggled forward and backward, and untoggled.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a key pad device that provides the same function as a keyboard or keypad with a mistake proof design that allows one hand use and only three fingers. Each of the primary two fingers has nine pressure points, or keys, whose location is accessible by moving left to right, up and down, forward and back, side to side, and center. A thumb toggle can operate in one of three positions—up, down or not toggled.

Figure 1:
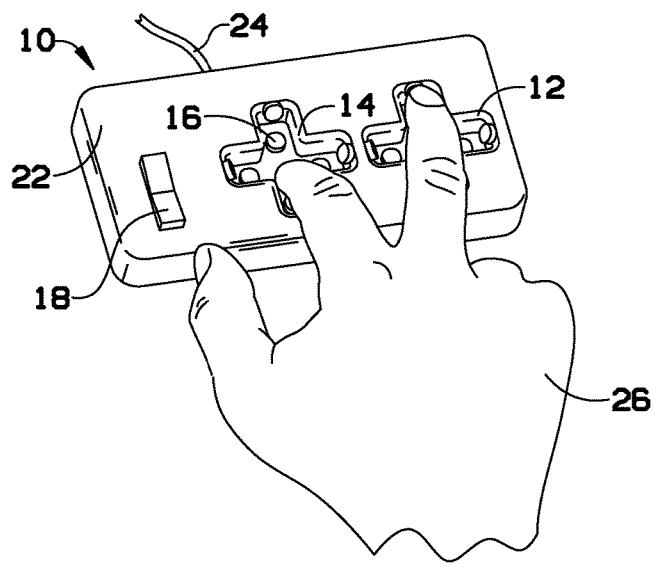
FIG. 1 is a perspective view of a blind key pad, in use, according to an exemplary embodiment of the present invention.
Figure 2:
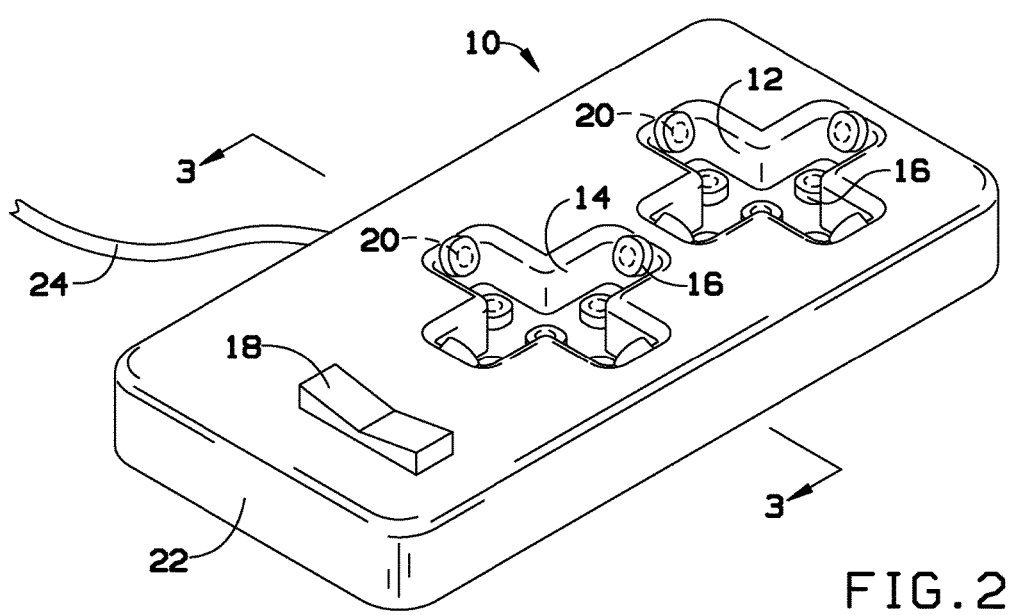
FIG. 2 is a perspective view of the blind key pad of FIG. 1.
Figure 3:
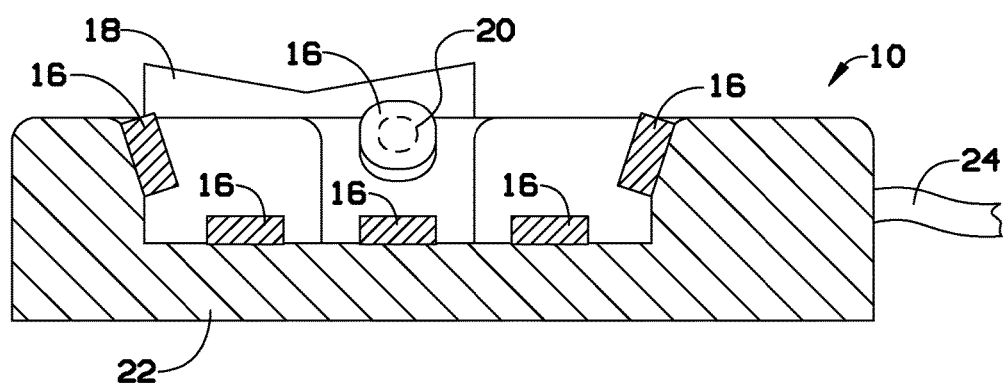
FIG. 3 is a cross-sectional view taken along line 3-3 of FIG. 2.

Referring now to FIGS. 1 through 3, a blind key pad 10 can include a first finger slot 12 and a second finger slot 14, each designed a receive a finger of a user 26 therein, as shown specifically in FIG. 1. The blind key pad 10 can be disposed in a housing 22 have a thickness generally from about 0.5 inch to about 2 inches, typically about 1 inch. The first finger slot 12 and the second finger slot 14 can be formed into the thickness of the key pad 10, typically from about ¼ to about 1 inch deep. The finger slots 12, 14 can assure proper placement of the user's fingers. Typically, the finger slots 12, 14 are formed from the central intersection of two orthogonal channels formed in the key pad 10. Typically, these channels are formed with one being parallel to the length of the key pad 10 and the other being parallel with the width of the key pad 10.

Keys 16 can be disposed in each of the first finger slot 12 and the second finger slot 14. Typically, nine keys 16 can be disposed in each of the finger slots 12, 14. Five keys 16 can be disposed in a cross pattern on a bottom portion of each of the finger slots 12, 14 (with one key 16 in the center of the cross pattern). Four additional keys 16 can be disposed on the sides of each of the finger slots 12, 14, at the ends of the cross pattern. A user can therefore easily find the two cross patterns and, by feel alone, can easily position their finger in the center of the cross pattern and easily strike any key therein.

A key marker area 20 can be provided on each key 16. The marker area 20 could be used, for example, to identify the characters accessible by depressing that specific key 16.

The key pad 10 can further include a thumb rocker key 18. The thumb rocker key 18 can be toggled in a first position, can be toggled in a second position, or can be untoggled, thus providing three options for each of the keys 16. The thumb rocker key 18 can default in the untoggled position and can be rocked, typically towards and away from the user, to toggle the thumb toggle key 18 in either of the two toggled positions.

The key pad 10 can include a connection cord 24 to permit the key bad 10 to interacting with an electronic device, such as a computer, smart phone, data entry terminal, automobile control, machinery control, or the like. In some embodiments, the key pad 10 can be equipped with the necessary electronic components, as may be known in the art, to provide a wireless connection to a suitable electronic device. This wireless connection could be made using various protocols, such as WiFi, Bluetooth®, or the like.

It should be understood, of course, that the foregoing relates to exemplary embodiments of the invention and that modifications may be made without departing from the spirit and scope of the invention as set forth in the following claims.

What is claimed is:

1. A one handed key pad operable by only a thumb and two fingers of a user's hand comprising:
   a housing having a top surface;
   a first finger slot formed as a first depression into the top surface of the housing;

a second finger slot formed as a second depression into the top surface of the housing separate from the first finger slot;

the first finger slot and the second finger slot each formed from the intersection of two elongate channel wells formed extending into the housing defining a plurality of distinct segments in each of the first finger slot and the second finger slot, the first finger slot configured to receive a first finger therein and the second finger slot configured to receive a second finger of a same user hand therein;

a plurality of keys disposed within each of the plurality of distinct segments of each of the first and second finger slots, wherein the plurality of keys are operable by displacement of the user's first finger and second finger with in the plurality of distinct segments of the respective first finger and second finger slots for positive engagement of the user's first finger and second finger over selected ones of the plurality of keys based on the displacement within the respective first and second finger slots; and a thumb rocker switch disposed adjacent the first finger slot, the thumb rocker switch causing corresponding variable outputs to be generated by each of the plurality of keys when the thumb rocker switch is respectively toggled on and off, wherein the one handed keypad is operable as a full alphabetic keyboard function while maintaining the first finger and the second finger within the respective first finger slot and second finger slot.

2. The key pad of claim 1, wherein the thumb rocker switch is toggled between a first toggled position, a second toggled position and an untoggled position.

3. The key pad of claim 1, wherein the plurality of keys includes nine keys in each of the first finger slot and the second finger slot.

4. The key pad of claim 1, wherein the first finger slot and the second finger slot are each formed from an orthogonal crossing of two channels formed in the housing.

5. The key pad of claim 4, wherein five keys are disposed on a bottom surface portion of each of the first finger slot and the second finger slot.

6. The key pad of claim 5, wherein four additional keys are disposed at sides of each of the first finger slot and the second finger slot, the four additional keys disposed on a side surface at termini of the two channels, wherein the four additional keys are oriented at an offset angle with respect to a lower portion of the side surface at the termini of the two channels.

7. The key pad of claim 6, wherein the four keys disposed at termini of the two channels are disposed offset from a vertical orientation.

8. The key pad of claim 1, wherein the first depression and the second depression have a depth of between about ¼ to 1 inch.

9. The key pad of claim 1, wherein the keys are configured to function as a keyboard operable with the users fingers on a single hand remaining within the first slot and the second slot.

10. A blind key pad comprising:
a housing;
a first elongate finger well slot formed as a first cross-shaped depression extending through a top surface and into the housing;
a second elongate finger well slot formed as a second cross-shaped depression extending through a top surface and into the housing;
nine keys disposed in each of the first and second elongate finger well slots, wherein eight keys disposed in each of a bottom surface and a side surface in each of four quadrants defining a plurality of distinct segments within the first and the second cross-shaped depressions, and one of the nine keys disposed in the bottom surface at an intersection of the first and second elongate finger well slots, the first and second finger elongate well slots adapted to receive a user's fingers therein and operable as a full alphabetic keyboard function with two fingers engaged in the first and second elongate finger slots of a single hand of user,
wherein the user, by feel alone, can determine a positive engagement of their fingers in the first and second cross-shaped depressions relative to each of the nine keys for a blind operation of the keypad; and
a thumb rocker switch disposed adjacent the first finger elongate well slot, the thumb rocker switch causing corresponding variable outputs to be generated by each of the nine keys when the thumb rocker switched is toggled forward and backward, and untoggled.

11. The key pad of claim 10, wherein five keys are disposed on a bottom surface portion of each of the first finger slot and the second finger slot, one each of the five keys disposed at ends of the bottom surface of the cross-shaped depression and one of the five keys disposed at an intersection of the cross-shaped depression.

12. The key pad of claim 11, wherein four additional keys are disposed at sides of each of the first finger slot and the second finger slot, the four additional keys disposed at termini of the cross-shaped depression, wherein the four additional keys are oriented at an outwardly splayed offset angle at the termini of the two channels.

13. The key pad of claim 12, wherein the four keys disposed at termini of the two channels are disposed offset from a vertical orientation.

14. The key pad of claim 10, where the first finger slot and the second finger slot have a depth of between about ¼ to 1 inch.

\* \* \* \* \*